US010088968B2

(12) United States Patent
Liao

(10) Patent No.: US 10,088,968 B2
(45) Date of Patent: Oct. 2, 2018

(54) TOUCH PANEL AND DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventor: Liqing Liao, Beijing (CN)

(73) Assignees: BOE TECHNOLOGY GROUP CO., LTD., Beijing (CN); HEFEI BOE OPTOELECTRONICS TECHNOLOGY CO., LTD., Hefi, Anhui (CN)

( * ) Notice: Subject to any disclaimer, the term of this patent is extended or adjusted under 35 U.S.C. 154(b) by 0 days.

(21) Appl. No.: 15/209,901

(22) Filed: Jul. 14, 2016

(65) Prior Publication Data
US 2017/0192563 A1 Jul. 6, 2017

(30) Foreign Application Priority Data
Jan. 5, 2016 (CN) .......................... 2016 1 0006921

(51) Int. Cl.
*G06F 3/044* (2006.01)
*G06F 3/047* (2006.01)
*G06F 3/041* (2006.01)

(52) U.S. Cl.
CPC .............. *G06F 3/047* (2013.01); *G06F 3/044* (2013.01); *G06F 3/0412* (2013.01); *G06F 2203/04112* (2013.01)

(58) Field of Classification Search
CPC ................................ G06F 3/0412; G06F 3/044
See application file for complete search history.

(56) References Cited

U.S. PATENT DOCUMENTS

2010/0289765 A1* 11/2010 Noguchi ............. G02F 1/13338
345/173
2012/0105347 A1    5/2012 Pak
(Continued)

FOREIGN PATENT DOCUMENTS

| CN | 202661991 U | 1/2013 |
| CN | 103793120 A | 5/2014 |
| CN | 104035639 A | 9/2014 |

OTHER PUBLICATIONS

1st Office Action dated Oct. 27, 2017, in corresponding CN 201610006921.8, with English translation.

*Primary Examiner* — Amr Awad
*Assistant Examiner* — Stephen Bray
(74) *Attorney, Agent, or Firm* — Nath, Goldberg, and Meyer; Joshua B. Goldberg

(57) ABSTRACT

The present invention belongs to the field of display technology, and provides a touch panel and a display device, which can solve the problem of low sensitivity, complicated wiring, and high power consumption existing in the existing touch panel. The touch panel of the invention includes a substrate and a touch control layer provided on the substrate, the touch control layer comprising a plurality of touch control units, wherein each of the touch control units has a protrusion part and a recess part, wherein a shape of the protrusion part of any one of the touch control units matches with a shape of the recess part of a touch control unit adjacent thereto. The sensitivity of the touch panel provided in the present invention is significantly improved compared to the prior art.

8 Claims, 3 Drawing Sheets

(56) References Cited

U.S. PATENT DOCUMENTS

| | | | |
|---|---|---|---|
| 2013/0141369 A1* | 6/2013 | Huang | G06F 3/041 345/173 |
| 2015/0286317 A1* | 10/2015 | Shepelev | G06F 3/0416 345/174 |
| 2016/0018922 A1 | 1/2016 | Wang et al. | |
| 2016/0253024 A1* | 9/2016 | Aoyama | G06F 3/0416 345/174 |
| 2016/0259443 A1 | 9/2016 | Yang et al. | |
| 2016/0291752 A1* | 10/2016 | Li | G06F 3/0412 |
| 2016/0342260 A1* | 11/2016 | Qin | G06F 3/044 |
| 2017/0010724 A1* | 1/2017 | Cao | G06F 3/0412 |

\* cited by examiner

TOUCH PANEL AND DISPLAY DEVICE

TECHNICAL FIELD

The present invention relates to the field of display technology, and in particular relates to a touch panel and a display device.

BACKGROUND

Because of having operability, visualizability and flexibility, touch panels have been applied to most human-computer interaction means such as a personal mobile communication device (e.g. a smart phone), an integrated information terminal (e.g. a tablet computer), a super notebook computer and the like. Touch panels can be classified into four main types, which are resistive touch panels, capacitive touch panels, infrared touch panels and surface acoustic wave (SAW) touch panels, according to the principle of touch control. A capacitive touch panel, among the four main types, has a multi-touch function, a fast response time, a long service life, a high transmittance, and an excellent user experience of use. Meanwhile as the gradual improvement of the technology, a yield rate of a capacitive touch panel has been significantly increased, and a price of a capacitive touch panel has been decreasing, making it a major technical means of touch interaction for middle and small sized information terminals at the moment.

FIG. 1 shows a schematic plan view of an existing self-capacitive touch panel designed by employing an in-cell touch pattern. Each rectangle (with an actual size of 5 mm×5 mm) in FIG. 1 represents a touch control unit 1, which functions as both TX (transmitting signal) and RX (receiving signal). Each touch control unit 1 is connected to a pin of a driving chip (integrated circuit (IC)) 21 located at a bonding region of a flexible printed circuit (FPC) board 2 via a signal line 3. During an operation of a capacitive touch panel, a touch by a human finger may result in a change in a self-capacitance of a corresponding rectangular touch control unit 1, and a corresponding electrical signal is produced therewith. The driving chip 21 captures this electrical signal, and then a specific position at which the finger touch took place can be determined based on the change in the capacitance of the touch control unit 1, as shown in FIG. 2.

In FIG. 1, each touch control unit 1 is required to correspond to a signal line. The smaller the size of the rectangular touch control unit 1, the larger the number of the touch control units 1 that undergo changes in capacitance in a single touch operation, and the higher the sensitivity of touch control. However, too many touch control units 1 may lead to too many signal lines, so as to greatly increase space required for wiring in a fan-out region of the touch panel, resulting in an excessively wide bezel of the display device. Also, too many touch control units 1 may further increase power consumption, as well as the difficulty of FPC bonding.

SUMMARY

To address the above problem existing in the existing touch panel, the present invention provides a touch panel with a high sensitivity, a simple wiring, and a low power consumption, and a display device including the touch panel.

As a technical solution to the technical problem of the present invention, there is provided a touch panel, comprising a substrate and a touch control layer provided on the substrate, the touch control layer comprising a plurality of touch control units, wherein each of the touch control units has a protrusion part and a recess part, wherein a shape of the protrusion part of any one of the touch control units matches with a shape of the recess part of a touch control unit adjacent thereto.

Optionally, the touch control layer further comprises an auxiliary touch control unit provided in a peripheral region of the touch control layer, and a shape of the auxiliary touch control unit matches with a shape of the touch control unit also provided in the peripheral region of the touch control layer, such that a shape of the touch control layer corresponds to a shape of a display region of the touch panel.

Optionally, the touch panel further comprises a plurality of signal lines, wherein one end of each signal line is connected to one of the touch control units, with the other end connected to a driving chip.

Further optionally, the signal lines and data lines of the touch panel are provided in one layer, and are formed of a same material.

Optionally, each of the touch control units may be further time-division multiplexed as a common electrode of the touch panel.

Optionally, a material of the touch control unit is ITO.

Optionally, shapes of the plurality of the touch control units include a first shape and a second shape, the first shape and the second shape are alternately provided in both a row direction and a column direction; wherein optionally, a first side and a third side of the first shape are provided opposite to each other, and a second side and a fourth side of the first shape are provided opposite to each other; the first side and the third side of the first shape each has one protrusion part, and these two protrusion parts are provided symmetrically; the second side and the fourth side of the first shape each has one recess part, and these two recess parts are provided symmetrically; and optionally, a first side and a third side of the second shape are provided opposite to each other, and a second side and a fourth side of the second shape are provided opposite to each other; the first side and the third side of the second shape each has one recess part, and these two recess parts are provided symmetrically; the second side and the fourth side of the second shape each has one protrusion part, and these two protrusion parts are provided symmetrically.

As a technical solution to the technical problem of the present invention, there is further provided a display device, which comprises the above touch panel.

The Present Invention has the Following Beneficial Effects

In the present invention, because a shape of the protrusion part of any one of the touch control units matches with a shape of the recess part of a touch control unit adjacent thereto, a touch of a human finger on the touch panel will definitely result in change in self capacitances of at least two touch control units; while in the prior art, when a human finger touches the touch panel, the minimum number of touch control units that undergo change in self capacitance is one, due to the touch control unit in the prior art being rectangular. Thus the sensitivity of the touch panel provided in the present invention is significantly improved compared to the prior art.

DETAILED DESCRIPTION

In order to provide a better understanding of the technical solutions of the present invention to those skilled in the art, the invention is described in further detail below in conjunction with the drawings and specific implementations.

Embodiment 1

Figure 3:
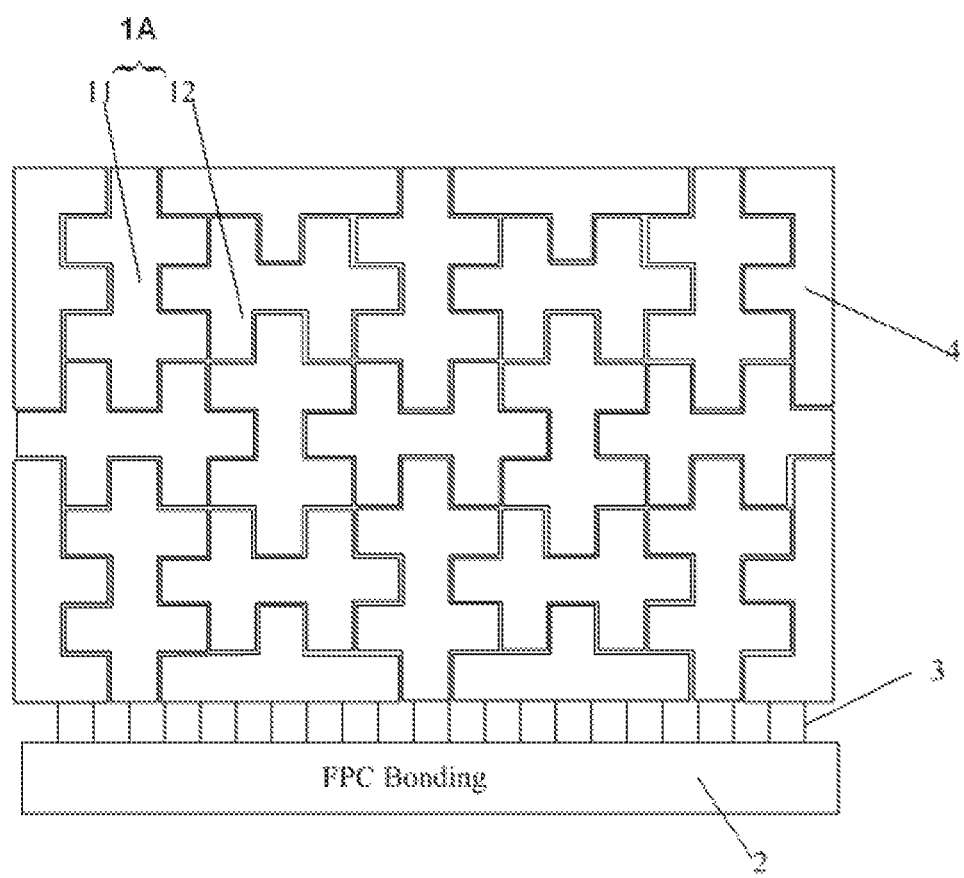
FIG. 3 is a schematic diagram of a structure of the touch panel of Embodiment 1 of the invention.
Figure 4:
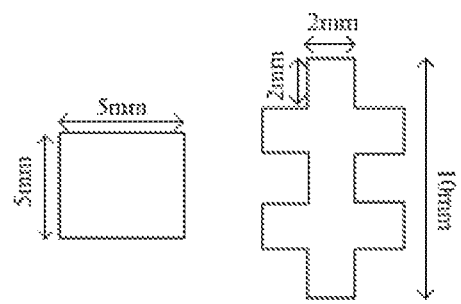
FIG. 4 is a schematic diagram showing comparison of a touch control unit of the touch panel of Embodiment 1 of the invention (on the right) with a touch control unit of an existing touch panel (on the left)

As shown in FIGS. 3 and 4, the present embodiment provides a touch panel, which includes a substrate and a touch control layer provided on the substrate, the touch control layer including a plurality of touch control units 1A, which are pieced together. The touch panel is a self-capacitive touch panel, hence the touch control unit 1A functions as both a touch control electrode and a sensing electrode. Each of the touch control units 1A has a protrusion part and a recess part, wherein a shape of the protrusion part of any one of the touch control units 1A matches with a shape of the recess part of a touch control unit 1A adjacent thereto. In other words, the protrusion part can be put into the recess part and pieced together with the recess part.

Figure 1:
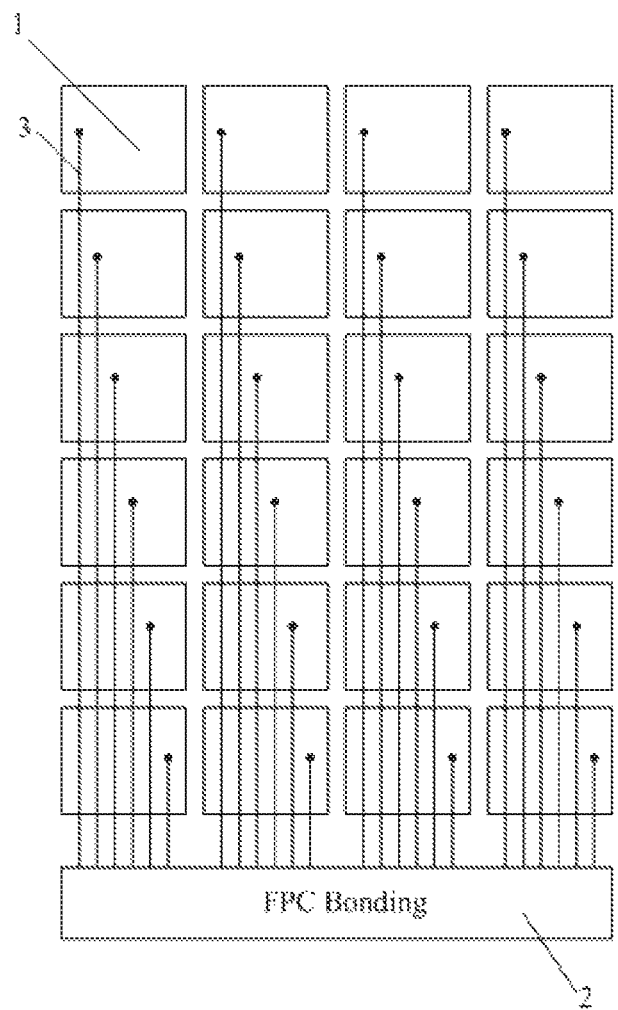
FIG. 1 is a schematic diagram of a structure of an existing touch panel.
Figure 2:
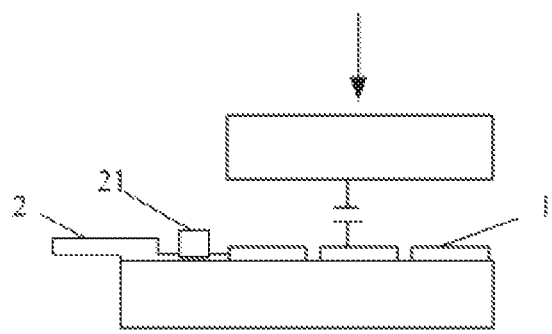
FIG. 2 is a schematic diagram showing a self-capacitance being changed when a touch occurs on the touch panel of FIG. 1.

In the present embodiment, because the touch control unit 1A has a small size, and the shape of the protrusion part of any one of the touch control units 1A matches with the shape of the recess part of a touch control unit 1A adjacent thereto, when a human finger touches the touch panel, there must occur change in self capacitances of at least two touch control units 1A. While in the prior art, when a human finger touches the touch panel, due to the rectangular touch control unit 1 (as shown in FIG. 1), the minimum number of touch control units 1 that undergo change in self capacitance is one. Thus the sensitivity of the touch panel provided in the present embodiment is significantly improved compared to the prior art.

As a preferable structure of the present embodiment, as shown in FIG. 3, shapes of the plurality of the touch control units 1A in the touch control layer include a first shape 11 and a second shape 12, and the first shape 11 and the second shape 12 are alternately provided in both a row direction and a column direction. A first side and a third side of the first shape 11 are provided opposite to each other, and a second side and a fourth side of the first shape 11 are provided opposite to each other; the first side and the third side of the first shape 11 each has one protrusion part, and these two protrusion parts are provided symmetrically; the second side and the fourth side of the first shape 11 each has one recess part, and these two recess parts are provided symmetrically, in other words, the second side and the fourth side of the first shape 11 each has two protrusion parts (located at both sides of the recess part), and these four protrusion parts are provided symmetrically in pairs. A first side and a third side of the second shape 12 are provided opposite to each other, and a second side and a fourth side of the second shape 12 are provided opposite to each other; the first side and the third side of the second shape 12 each has one recess part, and these two recess parts are provided symmetrically, in other words, the first side and the third side of the second shape 12 each has two protrusion parts (located at both sides of the recess part), and these four protrusion parts are provided symmetrically in pairs; the second side and the fourth side of the second shape 12 each has one protrusion part, and these two protrusion parts are provided symmetrically.

It can be seen from FIG. 3 that if the first shape 11 is considered to be provided vertically, then the second shape 12 is obtained by rotating the first shape 11 by 90 degrees to provide it horizontally. The touch control units 1A with the first shape 11 and the touch control units 1A with the second shape 12 are alternately provided in a row direction and a column direction. Such an arrangement allows the touch control units 1A in the touch control layer of the present embodiment to be distributed uniformly, which helps improve the uniformity of display of the touch panel.

In particular, the touch control layer including the touch control units 1A with the first shape 11 and the touch control units 1A with the second shape 12 may not only improve a sensitivity of the touch panel, but also reduce a number of signal lines, which is described below by way of example and comparison.

In case of two touch panels with a same size of display regions, assuming the size of each of display regions of the two touch panels is 80 mm×120 mm, if existing rectangular touch control units 1 are provided in the display region of one of the touch panels, and a size of each rectangular touch control unit 1 is 5 mm×5 mm (as shown in the left side of FIG. 4), then 16×24=384 touch control units 1 are required; if the touch control units 1A of the present embodiment are provided in the display region of the other of the touch panels, and the protrusion parts of the first shape 11 and the second shape 12 are each a 2 mm×2 mm sized rectangle (as shown in the right side of FIG. 4), with a maximum length of 10 mm in the column direction, then 13×19=247 touch control units 1A are required. It is well known to those of skill in the art that each touch control unit is required to be connected to a driving chip via a signal line 3. Therefore, the touch panel of the present embodiment requires only 247 signal lines 3, while the existing touch panel requires 384 signal lines 3. It is obvious that the number of signal lines 3 required for the touch panel of the present embodiment is significantly reduced compared to the prior art.

Figure 5:
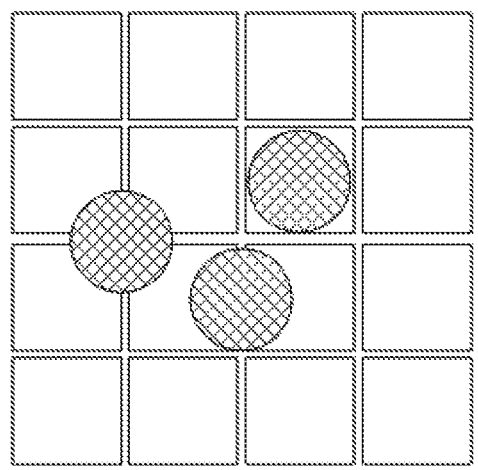
FIG. 5 is a schematic diagram of testing a touch performance of a touch control layer of an existing touch panel.
Figure 6:
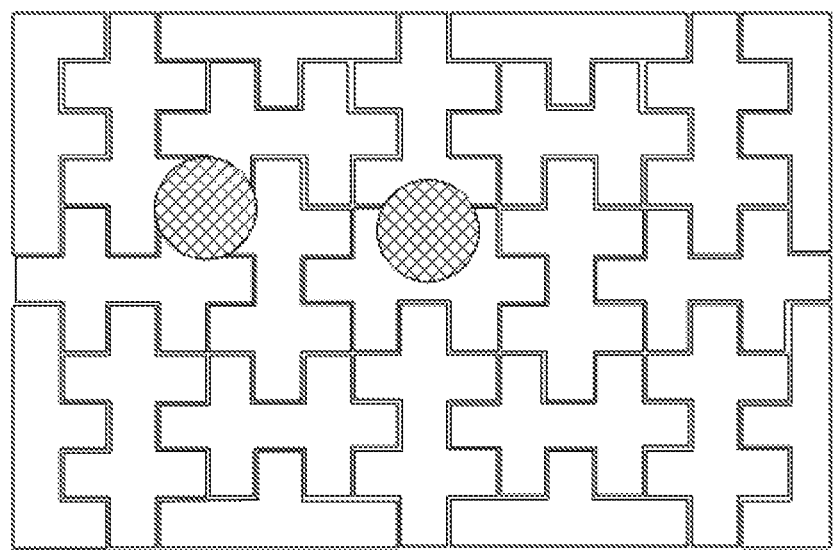
FIG. 6 is a schematic diagram of testing a touch performance of a touch control layer of the touch panel of Embodiment 1 of the invention.

In addition, as shown in FIGS. 5 and 6, the touch control layer of the touch panel of the present embodiment and the touch control layer of the existing touch panel are touched by using a copper pillar simulating a finger with a diameter of 5 mm, to test and compare touch performances of touch control layers of the two touch panels. And the test result is as follows: in the case of the touch control layer of the existing touch panel, a single touch causes change in self capacitances of at most four touch control units 1, and causes change in self capacitances of at least one touch control unit 1; in the case of the touch control layer of the touch panel of the present embodiment, a single touch causes change in self capacitances of at most four touch control units 1A, and causes change in self capacitances of at least two touch control units 1A. In other words, in the worst case, the touch panel of the present embodiment still has at least two signal lines receiving signals when a single touch occurs, so as to ensure the touch sensitivity.

To summarize, the touch control layer including the touch control units 1A with the first shape 11 and the touch control units 1A with the second shape 12 may not only improve the sensitivity of the touch panel, but also reduce the number of the signal lines 3, so as to accordingly reduce space required for wiring in a fan-out region of the touch panel, thereby further narrowing down a bezel of a display device, as well as decreasing a power consumption of the touch panel.

Further, the touch control layer of the present embodiment further includes at least one auxiliary touch control unit 4 provided in a peripheral region of the touch control layer, and a shape of the auxiliary touch control unit 4 matches with a shape of the touch control unit 1A which is also provided in the peripheral region of the touch control layer, such that a shape of the touch control layer corresponds to a shape of a display region of the touch panel. It can be seen in FIG. 3 that auxiliary touch control units 4, the shapes of which include a "T" shape and an "F" shape, are located in peripheral regions of the touch control layer, and are filled in space between outer sides of the touch control units 1A with the first shape 11 or the second shape 12 in the peripheral regions of the touch control layer and the edges of the display region. Such an arrangement eliminates blind angles of the touch panel, such that a touch can occur at any position on the touch control layer corresponding to the display region.

Preferably, the signal line 3 for connecting the touch control unit 1A to the driving chip 21 on a flexible circuit board 2 may be provided in a same layer in which data lines are provided, and the signal lines 3 and the data lines may be formed of a same material, to save production costs. Of course, a layer of signal lines may be separately prepared, and the touch control units 1A may be connected to the driving chips by the layer of signal lines.

Preferably, each of the touch control units 1A of the present embodiment may be further time-division multiplexed as (i.e., may also functions as) a common electrode of the touch panel. In other words, during a display stage, a common voltage signal is inputted to the touch control units 1A, and during a touch control stage, a touch control scan signal is inputted to the touch control units 1A, so as to save production costs without increasing a thickness of the touch panel. A material of the touch control unit 1A may be ITO.

To summarize, the touch panel provided by the present embodiment has a high sensitivity, a simple wiring, a narrow bezel and a low power consumption. It is to be noted that the shape of the touch control unit in the present embodiment is not limited to the first shape and the second shape described above, and may be other shapes that match to each other by protrusion and recess parts. For example, the rectangular protrusion part of the touch control unit 1A in FIG. 3 may be replaced by a sawtooth-shaped protrusion part, arc-shaped protrusion part and the like, which are all within the protection scope of the present embodiment.

Embodiment 2

The present embodiment provides a display device, which includes the touch panel of Embodiment 1.

The display device may be any product or component having a display function, such as a liquid crystal display device (e.g. liquid crystal panel), electronic paper, a mobile phone, a table PC, a TV, a monitor, a notebook computer, a digital photo frame, a navigator and the like.

The display device of the present embodiment has a high sensitivity.

It can be understood that the foregoing implementations are merely exemplary implementations used for describing the principle of the present invention, but the present invention is not limited thereto. Those of ordinary skill in the art may make various variations and modifications without departing from the spirit and essence of the present invention, and these variations and modifications shall fall into the protection scope of the present invention.

The invention claimed is:

1. A touch panel, comprising a substrate and a touch control layer provided on the substrate, the touch control layer comprising a plurality of touch control units, wherein each of the touch control units has a protrusion part and a recess part, wherein a shape of the protrusion part of any one of the touch control units matches with a shape of the recess part of a touch control unit adjacent thereto, wherein the plurality of the touch control units include touch control units having a first shape and touch control units having a second shape, the touch control units having the first shape and the touch control units having the second shape are alternately provided in both a row direction and a column direction, and wherein a first side and a third side of the first shape are provided opposite to each other, and a second side and a fourth side of the first shape are provided opposite to each other; the first side and the third side of the first shape each has one protrusion part, and these two protrusion parts are provided symmetrically; the second side and the fourth side of the first shape each has one recess part, and these two recess parts are provided symmetrically; and a first side and a third side of the second shape are provided opposite to each other, and a second side and a fourth side of the second shape are provided opposite to each other; the first side and the third side of the second shape each has one recess part, and these two recess parts are provided symmetrically; the second side and the fourth side of the second shape each has one protrusion part, and these two protrusion parts are provided symmetrically.

2. The touch panel of claim 1, wherein the touch control layer further comprises an auxiliary touch control unit provided in a peripheral region of the touch control layer, and a shape of the auxiliary touch control unit matches with a shape of the touch control unit also provided in the peripheral region of the touch control layer, such that a shape of the touch control layer corresponds to a shape of a display region of the touch panel.

3. The touch panel of claim 1, further comprising a plurality of signal lines, wherein one end of each signal line is connected to one of the touch control units, with the other end connected to a driving chip.

4. The touch panel of claim 3, wherein the signal lines and data lines of the touch panel are provided in a same layer, and are formed of a same material.

5. The touch panel of claim 1, wherein each of the touch control units is further time-division multiplexed as a common electrode of the touch panel.

6. The touch panel of claim 1, wherein a material of the touch control unit is ITO.

7. A display device, comprising the touch panel of claim 1.

8. A display device, comprising the touch panel of claim 2.

* * * * *